United States Patent [19]

Castro et al.

[11] Patent Number: 4,913,254
[45] Date of Patent: Apr. 3, 1990

[54] VEHICLE ANTI-THEFT DEVICE

[75] Inventors: Felix Castro, West Palm Beach; Shelby Jarrell, Palm Beach Gardens; Oscar Oliva, West Palm Beach, all of Fla.

[73] Assignee: Fuelock, Inc., West Palm Beach, Fla.

[21] Appl. No.: 319,146

[22] Filed: Mar. 3, 1989

Related U.S. Application Data

[63] Continuation-in-part of Ser. No. 81,888, Aug. 10, 1987, Pat. No. 4,842,092.

[51] Int. Cl.$^4$ .............................................. B60R 25/00
[52] U.S. Cl. ...................................... 180/287; 70/163; 70/174
[58] Field of Search .................. 280/287; 70/163, 174, 70/177, 179

[56] References Cited

U.S. PATENT DOCUMENTS

| | | | |
|---|---|---|---|
| 1,067,549 | 7/1913 | Quigley | 70/177 |
| 1,506,493 | 8/1924 | Levison | 70/242 |
| 2,057,109 | 10/1936 | Parker | 70/244 |
| 2,103,937 | 12/1937 | Driscoll | 70/177 |
| 2,881,789 | 4/1959 | Finazzo | 137/354 |
| 2,913,894 | 11/1959 | Gieray et al. | 70/237 |
| 3,682,267 | 8/1972 | Kayser | 180/287 |
| 3,773,139 | 11/1973 | Landi | 180/287 |
| 3,782,862 | 1/1974 | Cammi | 324/65 R |
| 3,919,868 | 11/1975 | Lipschutz | 70/239 |
| 4,084,657 | 4/1978 | Bradley et al. | 180/287 |
| 4,353,336 | 10/1982 | Mowbray | 123/198 B |
| 4,377,178 | 3/1983 | Thompson | 70/177 |
| 4,422,314 | 12/1983 | Cooper | 70/242 |
| 4,458,510 | 7/1984 | Nielsen | 70/177 |
| 4,522,569 | 6/1985 | Taylor | 417/434 |

FOREIGN PATENT DOCUMENTS 1901368  9/1970  Fed. Rep. of Germany ...... 180/287

OTHER PUBLICATIONS

Parts Catalog–John Deere 310C backhoe loader.
Manual–Parts 936 Wheel Loader, Caterpillar Tractor Co.
Manual–3304 Vehicular Engine for 936 Wheel Loader, Caterpillar Tractor Co.
Manual–3306 Vehicular Engine, Caterpillar Tractor Co.

*Primary Examiner*—Kenneth R. Rice
*Attorney, Agent, or Firm*—Steele, Gould & Fried

[57] ABSTRACT

An anti-theft device is provided for vehicles and equipment powered by engines having an electrically-controlled fuel delivery system, and particularly for engines having a shut-off solenoid in combination with the fuel pump and governor assembly, which solenoid operates a valve to stop the flow of fuel to the engine. A lock switch is inserted in the electrical connection to the solenoid. There must be continuity across the lock switch for operation of the engine. The lock switch is preferably positioned substantially adjacent to the fuel pump and governor assembly. A first lock structure is secured to a fixed portion of the vehicle substantially adjacent to the lock switch. A housing is adapted to fit over the lock switch so as to substantially prevent access to the lock switch or the shut-off solenoid. The housing includes second lock structure adapted to engage the first lock structure so as to secure the housing against removal to prevent unauthorized operation of the engine.

10 Claims, 2 Drawing Sheets

1

VEHICLE ANTI-THEFT DEVICE

CROSS REFERENCE TO RELATED APPLICATION

This application is a continuation-in-part of Applicant's co-pending U.S. Patent Application Ser. No. 081,888, filed Aug. 4, 1987, now U.S. Pat. No. 4,842,092.

BACKGROUND OF THE INVENTION

1. Field of the Invention

This invention relates generally to vehicle anti-theft devices, and more particularly to vehicle anti-theft locks.

2. Description of the Prior Art

Vehicle theft is a continuing problem but is of the utmost concern to the owners of heavy equipment such as bulldozers, graders, loaders, tractors, and other heavy machinery using diesel engines as a power source. Heavy equipment is difficult to transport back to the equipment yard on a daily basis and, therefore, is usually left on the jobsite unattended.

Past attempts to offer an anti-theft device for heavy equipment have been limited to either interruption of the electrical system through a keyed switch in the operator's compartment or to cutting off fuel flow in the fuel system. Both methods can be overcome by thieves, who often are skillful at bypassing the cutoff device. Additionally, because thieves often have direct access to the cutoff device, they sometimes are able to disarm the cutoff device itself so that bypassing the device is not necessary.

This Applicant's pending U.S. Patent Application Ser. No. 081,888 describes a vehicle anti-theft device for heavy equipment powered by engines with an external governor linkage lever, in which the linkage lever is locked against movement to prevent operation of the engine. A lock housing prevents access to the lindage lever. There are a number of vehicles and other heavy equipment in which an external governor linkage lever can not be used to stop operation of the engine. Particularly, many engines utilize a fuel pump and governor assembly in which an electrically controlled shut-off solenoid is utilized to cease operation of the engine. A typical electrical control circuit for such an engine includes, in series, the main battery of the engine or an alternate power supply, a keyed switch in the operator's compartment, and the shut-off solenoid. This invention is particularly directed to the prevention of theft or unauthorized operation of these types of vehicles and engines, and to engines with alternative electrical fuel control systems.

SUMMARY OF THE INVENTION

It is an object of the invention to provide an anti-theft device for vehicles and equipment with engines having an electrically-controlled fuel delivery system.

It is another object of the invention to provide an anti-theft device which cannot be easily bypassed.

It is yet another object of the invention to provide an anti-theft device which cannot be easily disarmed.

It is still another object of the invention to provide an anti-theft device which will have no effect on the normal operation of the vehicle.

It is yet another object of the invention to provide an anti-theft device which is easily installed.

These and other objects are accomplished by an anti-theft device for vehicles and equipment powered by engines having a fuel supply that is controlled at least in part by electric circuitry. A lock switch is provided in the circuitry and is adapted to alter the circuit in a first switch position to prevent operation of the engine, and in a second switch position to complete the circuit and permit normal operation of the engine. The switch is preferably provided substantially adjacent to the fuel pump and governor assembly, which in many engines includes a shut-off solenoid adapted to control the flow of fuel to the engine. A first lock structure is secured to a fixed portion of the vehicle or equipment, preferably adjacent to the lock switch.

A lock housing is adapted to fit over the first lock structure and the lock switch to prevent access to the lock switch. The lock housing will normally also prevent access to a substantial portion of the fuel pump and governor assembly, and to the shut-off solenoid. The lock switch thereby cannot be bypassed to energize the shut-off solenoid and to operate the engine. A second lock structure is provided in the lock housing and is adapted to engage the first lock structure to secure the housing in the protective position covering the lock switch and the shut-off solenoid.

The first lock structure preferably comprises an eye member. The second lock structure preferably includes a locking member or clasp adapted to detachably engage the eye member to secure the housing in position over the lock switch. The second lock structure can be a lock assembly fixed to the lock housing. A space is preferably provided in the lock housing to permit passage of the eye member to a position where it can be engaged by the locking member of the lock assembly. The lock housing is thereby secured in position over the lock switch to prevent manipulation of the lock switch and operation of the electric circuit necessary for the operation of the engine. An example of a suitable lock is that made by the American Lock Company, of Crete, Ill., and manufactured pursuant to Patent No. 3,769,821, the disclosure of which is herein fully incorporated by reference.

The eye member of the first lock structure can be provided on a plate or bracket and fastened to the engine by bolts, welds, or other suitable fastening structure. The lock housing is preferably adapted to fit over and around the bracket, and to substantially conform to the contour of adjacent portions of the vehicle, equipment or engine so as to substantially prevent access to the lock switch and shut-off solenoid.

The inventive device is useful for virtually any engine having an electrically-controlled fuel supply. The invention is particularly well suited for use with engines having a shut-off solenoid, but can also be useful for engines with alternative electrical means for controlling fuel delivery to the engine. Suitable engines include those found on heavy equipment such as bulldozers, graders, loaders, tractors and heavy machinery.

The invention is preferably constructed of materials which will resist tampering by thieves. A good quality stainless steel or the like is a preferable material to ward off persistent thieves. It is sometimes desirable to encase the lock assembly in a casing of stainless steel or another material which will withstand severe blows or other types of tampering.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

Figure 1:
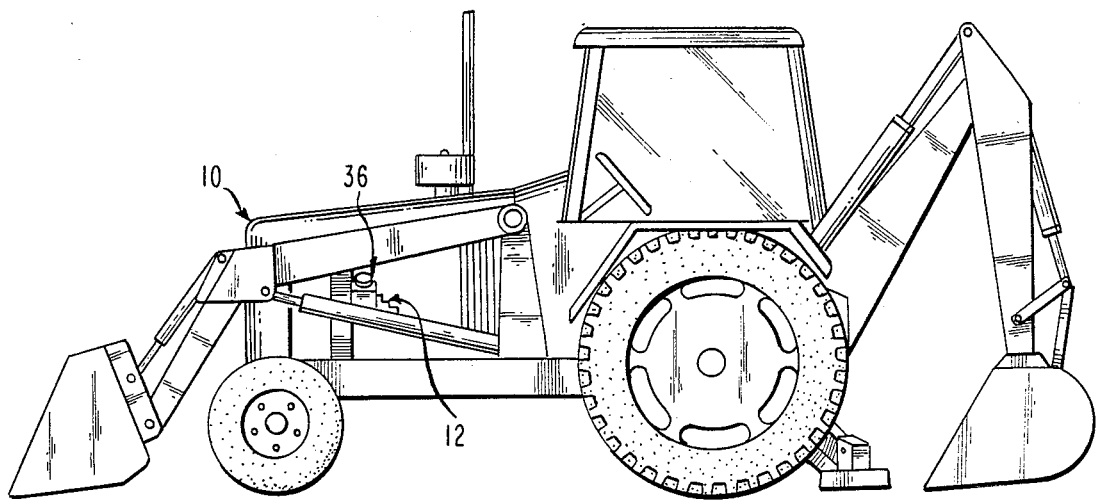
FIG. 1 is a side elevation of a backhoe provided with an anti-theft device according to the invention.
Figure 2:
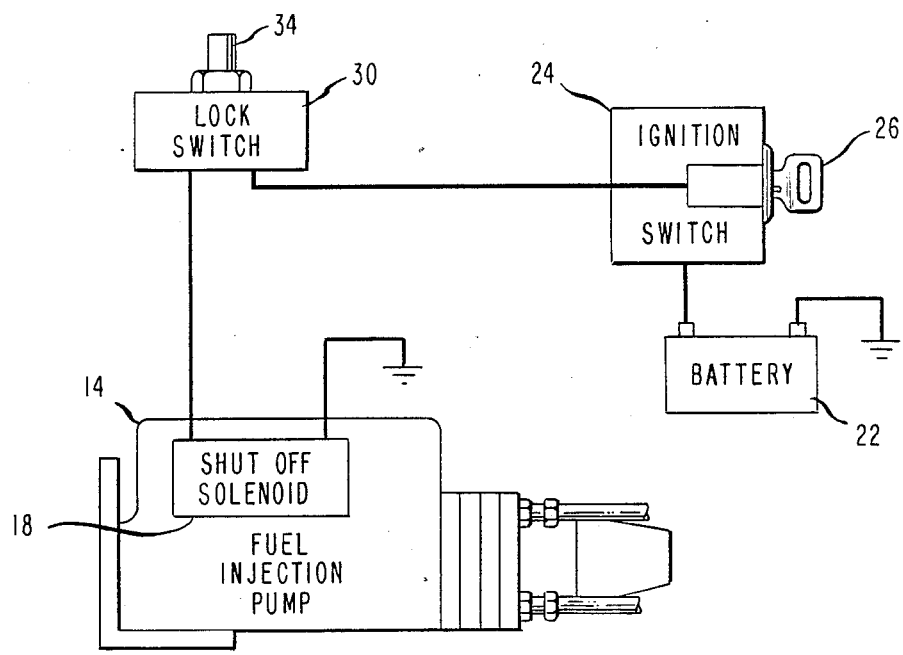
FIG. 2 is a block diagram of electrical circuitry according to the invention.
Figure 3:
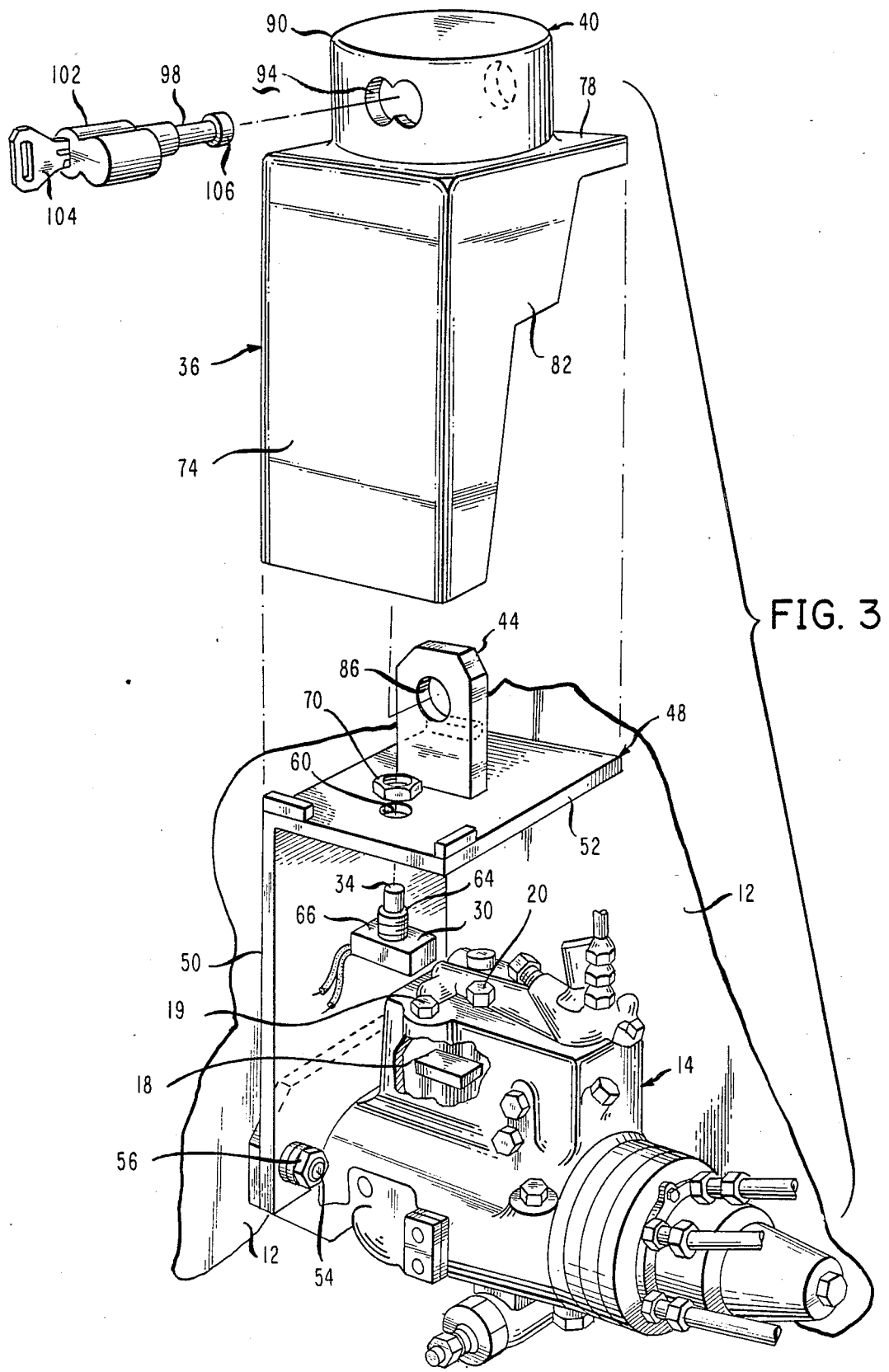
FIG. 3 is an exploded perspective of a vehicle anti-theft device according to the invention as installed over a fuel pump and governor assembly partially broken away to depict internal features.

The invention is suited for installation in heavy equipment such as bulldozers, graders, loaders, tractors and other machinery having electrically-controlled fuel delivery systems. A backhoe 10 shown in FIG. 1 is utilized for purposes of illustration. The backhoe 10 has an engine 12 which typically includes a fuel pump and governor assembly 14 (FIGS. 2-3), the operation of which is known and described in available literature including the parts catalog of the John Deere 310C Backhoe Loader, published by the John Deere Company of Moline, Ill. The disclosure of this manual is hereby incorporated by reference.

The governor throttle assembly (not shown) used by the operator to control the speed of the engine cannot be used to shut off the engine, as the engine will idle at even the lowest throttle setting. A shut-off solenoid 18 is therefore provided to stop the flow of fuel to the engine. The shut-off solenoid 18 is typically enclosed within the fuel pump and governor assembly 14, and is connected to the circuitry of the engine through contact screws 19, 20. The shut-off solenoid 18 typically will operate to stop the flow of fuel unless the solenoid is energized. The ignition switch 24 is typically in series between the battery 22 and the shut-off solenoid 18. An ignition key 26 is manipulated to close the ignition switch 24 in known fashion to energize the shut-off solenoid 18. The shut-off solenoid 18 will actuate a suitable valve mechanism (not shown) to open the flow of fuel to the cylinders and to thereby permit operation of the engine 12.

Applicant's co-pending Patent Application Ser. No. 081,888, now U.S. Pat. No. 4,842,092, describes a vehicle anti-theft device in which a lock housing is utilized to prevent the theft of vehicles or equipment by locking and preventing access to the governor linkage lever. The disclosure of this application and patent is incorporated fully by reference in the present application, as principles of that invention are applicable to the present invention. The present invention contemplates the installation of a lock switch 30 in series between the battery 22 and the shut-off solenoid 18. The lock switch 30 is operable to interrupt electrical continuity to the shut-off solenoid 18 to prevent fuel from flowing from the fuel pump and governor assembly 14 to the engine cylinders. The lock switch 30 can be formed from several suitable constructions such as the push-button construction shown, wherein the manually-operated push-button 34 is operable to alternately open and close continuity across the lock switch 30.

A lock housing 36 is provided to prevent access to the lock switch 30 and thereby operation of the engine 12. The lock housing 36 preferably fits over the lock switch 30 and at least a portion of the fuel pump and governor assembly, particularly the shut-off solenoid 18, to substantially prevent bypass around the lock switch 30, activation of the shut-off solenoid 18, and operation of the engine 12. The lock housing 36 accordingly includes a lock assembly 40 which is adapted to engage a fixed portion of the vehicle or engine so as to prevent removal from its protected position over the lock switch 30 and fuel pump and governor assembly 14.

An eye member 44 or other suitable attachment member is preferably provided to engage the lock assembly 40 such that the lock housing 36 can be secured in position. It is presently preferred to provide the eye member 44 on a lock bracket 48, which can be substantially L-shaped in cross section. A leg 50 of the bracket can be fastened directly to the engine 12 by suitable fastening means such as bolts 54 and nuts 56. The eye member 44 is fixed to a base 52 of the lock bracket 48 in an upstanding fashion. A secure attachment site for the lock housing 36 and the lock assembly 40 is thereby provided.

The lock switch 30 can be secured to the base 52 with the push-button 34 extending upwardly through an aperture 60 formed in the base 52. A neck portion 64 of the lock switch 30 can extend through the aperture 60. Threads 66 formed in the neck 64 can engage a nut 70 to secure the lock switch 30 in place on the base plate 52. This will prevent movement of the lock switch 30 and will maintain the push-button 34 in an easily accessible position when the lock housing 36 has been removed.

The lock housing 36 is constructed so as to substantially cover and enclose the lock switch 30 from access by would-be thieves. The lock housing 36 includes a back plate 74, top plate 78, and side plate 82 which mate with respective portions of the lock bracket 48, engine 12, and fuel pump and governor assembly 14 to substantially cover and enclose the lock switch 30 and shut-off solenoid 18. The fastening bolts 54 and nuts 56 will also be enclosed, which prevents the simultaneous removal of the lock housing 36 and lock bracket 48 together.

The lock housing 36 is secured to the lock bracket 48 by engagement of the lock assembly 40 to the eye member 44. The eye member 44 can have an aperture 86 which is adapted to receive and engage a lock member from the lock assembly 40 so as to secure the lock housing 36 to the lock bracket 48. The lock assembly 40 can be selected from several suitable locks known in the art. A presently preferred lock assembly is the series 2000 lock of the American Lock Company of Crete, Ill. This lock is manufactured pursuant to U.S. Pat. No. 3,769,821, the disclosure of which is hereby incorporated by reference. The operation of this lock is more completely described in Applicant's co-pending parent application, however, the lock comprises an annular lock body 90 having an aperture 94 which is adapted to slidably receive a locking member 98. The locking member 98 can be inserted through the aperture 86 of the eye member 44 to firmly engage the housing 36 to the locking bracket 48 and to cover and enclose the lock switch 30 and the shut-off solenoid 18. The lock member 98 can be rotated within a lock cylinder 102 by operation of an appropriate key 104. A clasp 106 engages cooperating structure in the lock body 90 to prevent removal of the lock member 98 from the lock body 90 without authorization. Rotation of the key 104 will rotate the clasp 106 and release it from locking engagement with the housing 90. This will permit removal of the locking member 98 from engagement with the eye member 44, and thereby removal of the lock housing 36.

The invention is capable of taking several alternative forms. The lock housing of the invention can be secured to a portion of a vehicle or of a piece of equipment by alternative methods to prevent access to locking structure adapted to prevent fuel flow to the engine. The principles disclosed herein could be applied to engines having electronic fuel pumps, for example, to prevent any operation of the fuel pump. The lock housing can be fashioned in alternative shapes to conform to different part and equipment designs. The lock assembly, and manner of securing the lock housing to the vehicle or piece of equipment could be altered to other lock designs and constructions. The lock housing, lock bracket, and lock assembly are preferably made of a heavy guage stainless steel which will resist penetration, however, other suitable materials are possible.

It is apparent that this invention can be embodied in other specific forms without departing from the spirit or essential attributes thereof, and accordingly, reference should be had to the following claims, rather than to the foregoing specification, as indicating the scope of the invention.

I claim:

1. An anti-theft device for vehicles and equipment powered by engines having fuel delivery systems controlled at least in part by electrical systems, comprising:
   a lock switch provided in said electrical system and adapted to reversably alter said electrical system to prevent operation of said fuel delivery system, and thereby to prevent operation of said engine;
   a first lock structure secured to a fixed portion of the vehicle or equipment;
   a lock housing adapted to substantially cover and enclose said lock switch to prevent access to and manipulation of said lock switch, said lock housing having a second lock structure comprising a lock mechanism and being adapted to engage said first lock structure to secure said lock housing in position over said lock switch and to prevent unauthorized removal of said lock housing and manipulation of said lock switch, said second lock structure being releasable from said first lock structure by operation of said lock mechanism.

2. The anti-theft device of claim 1, wherein said fuel delivery system comprises a fuel pump and governor assembly, said assembly comprising electronic fuel control means, said lock switch being provided substantially adjacent said electronic fuel control means.

3. The anti-theft device of claim 2, wherein said electronic fuel control means comprises a shut-off solenoid.

4. The anti-theft device of claim 1, wherein the first lock structure comprises an eye member and said second lock structure comprises a lock member, said eye member having an aperture adapted to receive said lock member to secure said lock housing over said lock switch.

5. The anti-theft device of claim 4, wherein said second lock structure comprises an annular lock body, said eye member being positionable in said lock body to receive said lock member.

6. The anti-theft device of claim 1, wherein said first lock structure is fixed to a lock bracket, said lock bracket being engaged to a portion of the vehicle or equipment by fastening means.

7. The anti-theft device of claim 6, wherein said lock switch is fastened to said lock bracket, and said first lock structure extends outwardly from said lock bracket, whereby said first lock structure can be engaged to said second lock structure of said housing, said housing being adapted to nest snugly with said lock bracket and with a portion of said vehicle to cover and enclose said lock switch against unauthorized manipulation.

8. The anti-theft device of claim 6, wherein said fuel delivery system comprises a fuel pump and governor assembly, and said electrical system comprises a shut-off solenoid, the lock switch being adapted to interrupt electrical power to said solenoid to prevent operation of the engine, and said lock housing being adapted to cover and enclose said shut-off solenoid to prevent bypass around said lock switch.

9. The anti-theft device of claim 8, wherein said lock switch is a normally open switch.

10. An assembly for preventing the theft of vehicles and equipment having engines with a fuel delivery system, comprising:
    reversible means for preventing operation of said fuel delivery system;
    a housing adapted to fit over said means for preventing operation of said fuel delivery system, said housing having first lock means; and
    second lock means attached to a portion of said vehicle or equipment, said second lock means being adapted to engage said first lock means of said housing to secure said housing so as to enclose said means for preventing operation of said fuel delivery system, whereby unauthorized operation of said engine is prevented.

* * * * *